US008568066B2

(12) United States Patent
Beichter

(10) Patent No.: US 8,568,066 B2
(45) Date of Patent: Oct. 29, 2013

(54) CORE HOLE DRILLING MACHINE

(75) Inventor: Martin Beichter, Stuttgart (DE)

(73) Assignee: C. & E. Fein GmbH (DE)

( * ) Notice: Subject to any disclaimer, the term of this patent is extended or adjusted under 35 U.S.C. 154(b) by 1132 days.

(21) Appl. No.: 12/508,225

(22) Filed: Jul. 23, 2009

(65) Prior Publication Data

US 2010/0021249 A1 Jan. 28, 2010

(30) Foreign Application Priority Data

Jul. 23, 2008 (DE) ......................... 10 2008 035 308

(51) Int. Cl.
*B23B 45/14* (2006.01)

(52) U.S. Cl.
USPC ...................................... 408/76; 408/9; 173/2

(58) Field of Classification Search
CPC ....................................................... B23B 45/14
USPC ........... 408/76, 8, 9, 10; 318/245, 137; 173/2, 173/217
See application file for complete search history.

(56) References Cited

U.S. PATENT DOCUMENTS 2,887,910 A 5/1959 Williamson, Jr.
4,278,371 A 7/1981 Meyer
D273,496 S * 4/1984 House, II ..................... D15/132
4,591,301 A 5/1986 Pelfrey
4,604,006 A * 8/1986 Shoji et al. ...................... 408/76
5,007,776 A * 4/1991 Shoji ................................ 408/6
5,035,547 A * 7/1991 Shoji ................................ 408/6
5,061,886 A * 10/1991 Yamada ........................ 318/565
5,062,743 A * 11/1991 Wieland et al. ................... 408/6
5,096,339 A 3/1992 Shoji
5,126,643 A * 6/1992 French .......................... 318/434
5,275,514 A * 1/1994 Johnson .......................... 408/76
5,902,076 A * 5/1999 Miller et al. ...................... 408/6

(Continued)

FOREIGN PATENT DOCUMENTS

DE 4212562 A1 12/1993
DE 69729226 T2 9/2004

(Continued)

OTHER PUBLICATIONS

German Search Report; Application No. 10 2008 035 308.6; Dec. 1, 2010; 4 pages.
European Search Report; Application No. EP 09 00 9078; Nov. 26, 2010; 11 pages.

*Primary Examiner* — David Bryant
*Assistant Examiner* — Jason L Vaughan
(74) *Attorney, Agent, or Firm* — St. Onge Steward Johnston & Reens LLC

(57) ABSTRACT

A drilling machine, in particular a core hole drilling machine, having a mount on which an electromagnet is provided for attachment to a metal part on which a drilling unit is supported in displaceable fashion, wherein the drilling unit has a housing that accommodates an electric motor for driving a tool, is provided. There is provided a controller having at least one switch for switching on and off the electric motor and the electromagnet. The controller includes an operating and supervisory panel that is supported on an end of the housing opposite the tool. The switch for switching on and off the electromagnet and for switching off the electric motor is designed so that in the activated condition of the electric motor any operation of the controller will first cause the electric motor to be switched off before the electromagnet can be switched off.

17 Claims, 1 Drawing Sheet

(56) References Cited

U.S. PATENT DOCUMENTS

| | | | | |
|---|---|---|---|---|
| 6,072,675 | A | 6/2000 | Murakami et al. | |
| 7,121,773 | B2 * | 10/2006 | Mikiya et al. ..................... | 408/5 |
| 7,403,837 | B2 | 7/2008 | Graiger et al. | |
| 7,520,702 | B2 | 4/2009 | Wiehler et al. | |

FOREIGN PATENT DOCUMENTS

| | | | |
|---|---|---|---|
| DE | 20221166 | U1 | 5/2005 |
| EP | 1103350 | A2 | 5/2001 |
| EP | 1621286 | A2 | 2/2006 |
| GB | 2085767 | A | 5/1982 |

* cited by examiner

CORE HOLE DRILLING MACHINE

CROSS-REFERENCE TO RELATED APPLICATIONS

The present application claims priority of German patent application No. 10 2008 035 308.6 filed on Jul. 23, 2008, the content of which is incorporated herein by reference.

FIELD OF THE INVENTION

The present invention relates to a drilling machine, in particular a core hole drilling machine, having an electromagnet that is to be attached to a metal part, an electric motor for driving a tool and a controller that comprises at least one switch for switching on and off the electric motor and the electromagnet. The invention further relates to a method for controlling such a drilling machine.

BACKGROUND OF THE INVENTION

A drilling machine and a method of the before-mentioned kind are known from EP 1 103 350 A2.

One monitors in that case the power-on condition of an electric motor for driving a tool and an electromagnet that is intended to be attached to a ferromagnetic tool. The current of the electromagnet is reduced in a holding state, in which only the electromagnet is active while the electric motor is inactive, the full holding force being required only during drilling in operating condition.

Such core hole drilling machines, which are attached to a ferromagnetic part being normally the work piece, are exposed to the most diverse operating conditions. Frequently, work is to be performed overhead, or else on girders far above ground. To avoid accidents, extreme labor safety is therefore of great importance.

It has been found in operation that operator errors happen again and again in that the electromagnet sometimes is switched off when the electric motor is still running so that the holding force then no longer suffices to hold the relatively heavy drilling machine and the latter has to be held by one hand alone which leads to an increased risk of accident.

A further core hole drilling machine of a similar kind is known from EP 1 621 286 A2.

That machine comprises a mount on which an electromagnet is provided for attachment to a ferromagnetic metal part on which a drilling unit is supported in displaceable fashion, wherein the drilling unit comprises a housing that accommodates an electric motor intended to drive a tool, and wherein a controller is provided that comprises at least one switch for switching on and off an electric motor and the electromagnet.

The operating elements are arranged in this case on the side of the mount and/or of the housing of the drilling unit. In particular when working overhead or under similarly restricted conditions, the operator's view of the different functions is very limited.

SUMMARY OF THE INVENTION

In view of this it is a first object of the present invention to disclose an improved drilling machine, in particular a core hole drilling machine, which allows an improved labor safety when compared with prior core hole drilling machines.

It is a second object of the invention to disclose an improved method for controlling a drilling machine, in particular a core hole drilling machine, allowing a higher safety standard.

It is a third object of the invention to disclose an improved core hole drilling machine which allows a simple handling and control by an operator using same.

These and other objects of the invention are achieved by a drilling machine of the afore-mentioned kind with a controller which ensures that in the activated condition of the electric motor the electromagnet can be switched off only when the electric motor is in its switched off state.

With respect to the method, the object of the invention is achieved by a method for controlling a drilling machine, in particular a core hole drilling machine, comprising the following steps:

- Monitoring the power-on condition of an electromagnet intended to hold the drilling machine on a metal part;
- monitoring the activation of an electric motor intended to drive a tool;
- controlling the electric motor and the electromagnet so that in the activated condition of the electric motor the electric motor has to be switched off first and the electromagnet can be switched off only in the inactive condition of the electric motor.

The object of the invention is thus perfectly achieved.

Namely, the invention guarantees that in the running condition of the electric motor the electric motor will always be switched off first and that switching-off of the electromagnet will be possible only after the electric motor has been switched off.

Compared with known drilling machines this provides the advantage to reduce the risk of operator error.

According to an advantageous further development of the invention, the drilling machine comprises a speed sensor which is coupled to the controller in a manner such that the electromagnet can be switched off only when the electric motor is running at a speed lower than or equal to a predefined threshold speed.

The threshold speed may be approximately 150 r.p.m., in particular 100 r.p.m., 50 r.p.m. or 10 r.p.m.

That feature guarantees even greater safety from operator error because switching off the electromagnet is possible only when the electric motor has been switched off and, additionally, its speed has dropped so that any risks of accident no longer have to be feared.

According to an advantageous further development of the invention, the controller further has a design such that when the drilling machine is switched on, the electromagnet is switched on first and the electric motor is switched on only in response to a further activation of the controller.

This guarantees that driving the electric motor will be possible only after the drilling machine has been fixed on the respective metal part by the electromagnet.

According to another embodiment of the invention, the controller comprises a common switch, preferably one that can be activated via a push-button, for controlling the activation and deactivation of the electromagnet and the deactivation of the electric motor.

This leads to even greater safety from operator errors, the switch being designed in this case for activation and deactivation of the electromagnet, but only for deactivation of the electric motor. It is possible in this way, by operation of the switch before drilling is started, to guarantee that the drilling machine is first fixed on the metal part by the electromagnet.

According to a further development of the invention, at least one further switch is provided for switching on and off the electric motor, which permits the electric motor to be switched on only in the activated condition of the electromagnet.

This leads to the advantage that the electric motor can be switched on only via the at least one further switch so that any operator error is excluded. Switching-off the electric motor can be effected also via the further switch or else via the switch provided for operation of the electromagnet. When the latter is operated, the electric motor is switched off first. Deactivation of the electromagnet then follows after a certain delay or when the speed of the electric motor drops below a predefined threshold value.

The object of the invention is further achieved by a drilling machine, in particular a core hole drilling machine, comprising a mount on which an electromagnet is provided for attachment to a ferromagnetic metal part on which a drilling unit is supported in displaceable fashion, the drilling unit comprising a housing that accommodates an electric motor intended to drive a tool, and comprising a controller that comprises at least one switch for switching on and off an electric motor and the electromagnet, the controller comprising an operating and supervisory panel that is received on an end of the housing opposite the tool.

The object of the invention is thus perfectly achieved in this way as well.

The fact that the operating and supervisory panel of the controller is received on an end of the housing opposite the tool allows the operating and supervisory panel to be observed without interruption during the drilling operation. Accordingly, all necessary control and supervisory functions can be monitored more efficiently during operation, which leads to improved labor safety.

According to an advantageous further development of that embodiment, the drilling machine comprises an operating and supervisory panel having a plurality of switching elements, preferably in the form of push-buttons, preferably one switching element for switching on the electric motor for counter-clockwise rotation, one switching element for switching on the electric motor for clockwise rotation, one switching element for switching on and off a coolant supply, one switching element for switching on an electronic speed-reduction system, and one switching element for switching off the electric motor.

The operator therefore has a direct view of all necessary control and supervisory functions during operation.

According to an advantageous further development of that embodiment, at least one of the switching elements, preferably all switching elements, are designed as part of a dust-tight membrane keyboard or of a silicone sensor mat.

This provides the advantage that the risk of contamination and jamming of the switching element is clearly reduced.

According to another embodiment of the invention, a magnetic force sensor is provided for monitoring the magnetic holding force, the sensor being coupled to an optical and/or acoustic display.

This leads to a further improvement with respect to labor safety. Additionally, the magnetic force sensor may be coupled to the controller in order to prevent starting of the electric motor when the magnetic force has dropped below a predefined threshold value.

It is understood that the features of the invention mentioned above and those yet to be explained below can be used not only in the respective combination indicated, but also in other combinations or in isolation, without leaving the scope of the invention.

BRIEF DESCRIPTION OF THE DRAWINGS

Further features and advantages of the invention will become apparent from the description that follows of certain preferred embodiments, with reference to the drawing. In the drawing

DETAILED DESCRIPTION OF THE INVENTION

Figures 1, 2:
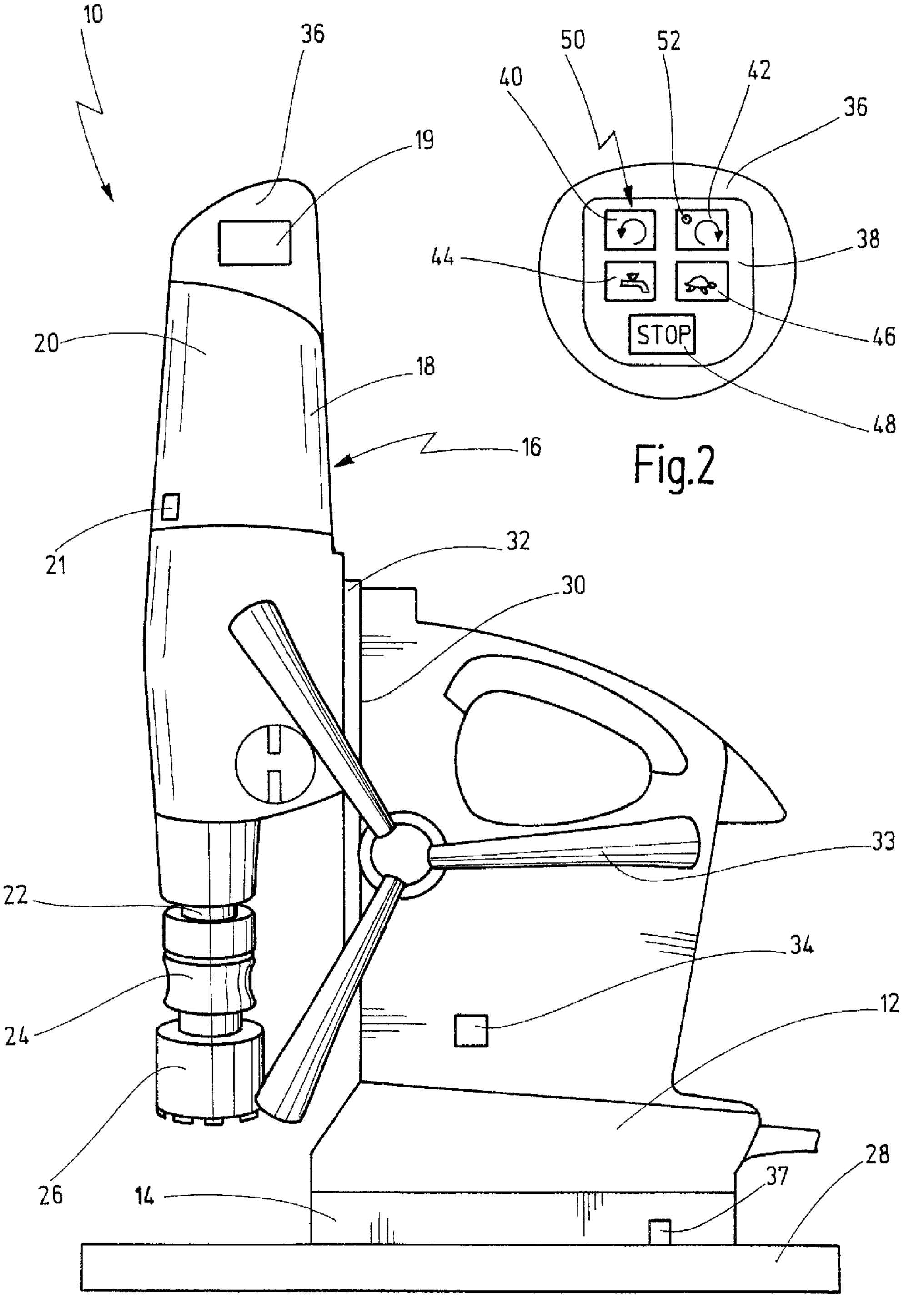
FIG. 1 is shows a perspective view of a drilling machine according to the invention in the form of a core hole drilling machine.
FIG. 2 shows an enlarged top view of the end of the housing of the drilling unit, taken from above.

In FIG. 1 a drilling machine according to the invention in the form of a core hole drilling machine is indicated generally by reference numeral 10.

The drilling machine 10 comprises a mount 12 that can be fixed on a ferromagnetic metal part 28 by an electromagnet 14. The mount 12 is provided with a guide 30 on which a drilling unit 16 can be displaced via a carriage 32.

The drilling unit 16 comprises a housing 18 which accommodates an electric motor 20 designed for driving a drilling spindle 22. A drilling tool 26 is detachably mounted on the outer end of the drilling spindle 22 via a fixture 24. Further, the housing 18 accommodates a control 19, preferably designed as a microprocessor control. The control 19 comprises a controller that includes a magnetic switch 34 mounted on the side of the mount 12 and that is designed for switching on and off the electromagnet 14 and the electric motor 20, as will be described in more detail hereafter.

The controller further comprises an operating and supervisory panel 38 which is arranged on the end 36 of the housing 18 opposite the tool 26, and the structure of which is shown in more detail in FIG. 2.

A feed unit 33 provided for advancing the drilling unit 16 along the guide 30 can be operated either automatically or by manual operation via a lever.

The operating and supervisory panel 38 comprises a total of five switching elements in the form of push-buttons 40, 42, 44, 46, 48 configured as large-format touch panels in a membrane keyboard 50 or a silicone sensor mat.

The switching element 40 is designed for switching on the electric motor 20 for counter-clockwise rotation. The switching element 42 is configured for switching on the electric motor 20 for clockwise rotation. The switching element 44 is configured for switching on and off the coolant supply. The switching element 46 is configured for activation of an electronic speed-reduction system.

The switching element 48, which is offset from the other four switching elements, is configured for switching off the electric motor 20.

The drilling unit 16 is further provided with a speed sensor 21 designed to monitor the motor speed, for example with a view to permitting the electromagnet to be switched off only when the speed is lower than 10 r.p.m. or is approximately equal to zero.

Further, a sensor 37 arranged on the electromagnet 14 serves to detect the magnetic holding force and is coupled to a display 52 (for example an LED display) for displaying the magnetic holding force provided on the switching element 42. When the magnetic holding force drops below a defined threshold value (dependent on the diameter drilled) then the switch 34 and/or the switching elements 40, 42 may be made to flash additionally.

Now, the magnetic switch 34 provided on the side of the mount 12 is coupled to the control 19 or the controller in such a way that for switching off the electromagnet 14 the electric motor 20 must be switched off first.

So, with the electric motor 20 running, operation of the push-button of the magnetic switch 34 has the effect to switch off the electric motor 20. The electromagnet 14 can then be switched off automatically after a sufficient delay or when the speed detected by the speed sensor 21 has dropped below a given threshold value of, for example, 10 r.p.m. or to zero.

In the deactivated condition of the electric motor 20 and the deactivated condition of the electromagnet 14, operation of the push-button of the magnetic switch 34 only has the effect to switch on the electromagnet 14.

When the magnetic switch 34 has been activated to switch on the electromagnet 14, the further functions of the core hole drilling machine can be controlled via the operating and supervisory panel 38 provided on the outer end 36 of the housing 18 on the side opposite the tool 26.

For switching on the electric motor 20 for clockwise or counter-clockwise rotation, a switching element of the operating and supervisory panel 38 must be operated with the electromagnet 14 in activated condition.

Once the magnetic switch 34 has been activated, and accordingly the electromagnet 14 has been activated as well, operation of the switching element 40 will cause the electric motor 20 to be switched on for counter-clockwise rotation. In contrast, operation of the switching element 42 in activated condition of the electromagnet 14 will cause the electric motor 20 to be switched on for clockwise rotation.

The switching element 44 serves to switch on or off the coolant supply. The switching element 46 serves to activate an electronic speed-reduction system. The switching element 48 serves to switch off the electric motor 20.

What is claimed is:

1. A drilling machine comprising:
- an electromagnet for attaching said drilling machine to a metal part, said electromagnet having a switched on condition and a switched off condition;
- an electric motor for driving a tool, said electric motor having a switched off condition and a switched on condition;
- a controller for controlling said electromagnet and said electric motor, said controller comprising at least one motor switch for switching on and off said electric motor and at least one magnetic switch for switching on and off said electromagnet; and
- a speed sensor which is coupled to said controller so as to allow switching off said electromagnet only when said electric motor is running at a speed lower than or equal to predefined threshold speed of 100 r.p.m.;
- wherein said controller is configured so as to allow switching off the electromagnet only when the electric motor is in its switched off condition.

2. The drilling machine of claim 1, which is configured as a core hole drilling machine.

3. The drilling machine of claim 1, wherein said threshold speed is 10 r.p.m.

4. The drilling machine of claim 1, wherein said controller is being configured to effect switching on said electromagnet first and thereafter switching on said electric motor only upon a further activation of said controller, when said drilling machine is switched on.

5. The drilling machine of claim 1, wherein said controller comprises a common switch for controlling switching on and switching off the electromagnet, and for controlling switching off the electric motor.

6. The drilling machine of claim 5, further comprising a mount comprising said electromagnet and a guide on which a drilling unit is supported displaceably, said mount further comprising a side surface on which said common switch is supported accessible from the outside.

7. The drilling machine of claim 1, further comprising a first motor switch for clockwise rotation of said electric motor and a second motor switch for an anti-clockwise rotation of said electric motor, both motor switches allowing an activation of the electric motor only in said switched on condition of said electromagnet.

8. The drilling machine of claim 1, further comprising a magnetic force sensor for monitoring magnetic holding force, said sensor being coupled to a signaling device for signaling when said magnetic holding force is below a certain threshold level.

9. A core hole drilling machine comprising:
- a mount wherein an electromagnet is received for securing said drilling machine to a metal part, said electromagnet having a switched on condition and a switched off condition;
- a guide supported by said mount;
- a drilling unit supported displaceably on said guide, said drilling unit comprising a housing and an electric motor received within said housing for driving a tool;
- a controller for controlling said electromagnet and said electric motor, said controller comprising at least one motor switch for switching on and off said electric motor and at least one magnetic switch for switching on and off said electromagnet;
- an operating and supervisory panel coupled to said controller and being received on an end of said housing opposite said tool; and
- a speed sensor which is coupled to said controller so as to allow switching off said electromagnet only when said electric motor is running at a speed lower than or equal to a redefined threshold speed of 100 r.p.m.;
- wherein at least one of said motor switch and said magnetic switch is arranged on said operating and supervisory panel; and
- wherein said controller is configured so as to allow switching off said electromagnet only when said electric motor is in its switched off condition.

10. The drilling machine of claim 9, wherein said operating and supervisory panel is configured as a dust-tight membrane keyboard or as a silicone sensor mat.

11. The drilling of claim 9, wherein said threshold speed is 10 r.p.m.

12. The drilling machine of claim 9, comprising a common switch for controlling switching on and switching off the electromagnet, and for controlling switching off the electric motor.

13. A core hole drilling machine comprising:
- a mount wherein an electromagnet is received for securing said drilling machine to a metal part;
- a guide supported by said mount;
- a drilling unit supported displaceably on said guide, said drilling unit comprising a housing and an electric motor received within said housing for driving a tool;
- a controller comprising at least one motor switch for switching on and off said electric motor and at least one magnetic switch for switching on and off said electromagnet;
- an operating and supervisory panel coupled to said controller and being received on an end of said housing opposite said tool; and
- a speed sensor which is coupled to said controller so as to allow switching off said electromagnet only when said electric motor is running at a speed lower than or equal to a predefined threshold speed of 100 r.p.m.;
- wherein at least one of said at least one motor switch and said at least one magnetic switch is arranged on said operating and supervisory panel;

wherein said controller is configured so as to allow switching off said electromagnet only when said electric motor is in its switched off condition.

14. The core hole drilling machine of claim 13, wherein said operating and supervisory panel comprises a plurality of switching elements.

15. The core hole drilling machine of claim 14, wherein at least one of said switching elements is configured as a push-button.

16. The core hole drilling machine of claim 14, wherein said switching elements comprise at least two switching elements selected from the group consisting of a switching element for switching on the electric motor for counter-clockwise rotation, a switching element for switching on said electric motor for clockwise rotation, a switching element for switching on and off a coolant supply, a switching element for switching on an electronic speed-reduction system, and a switching element for switching off said electric motor.

17. The drilling machine of claim 13, wherein said operating and supervisory panel is configured as a dust-tight membrane keyboard or as a silicone sensor mat.

* * * * *